March 20, 1934.  M. R. TREMBOUR  1,952,002
PROCESS OF MANUFACTURING COMPOSITE STEEL ARTICLES
Filed April 22, 1933
     
Fig. 1.  Fig. 2.  Fig. 3.  Fig. 4.  Fig. 5.  Fig. 6.
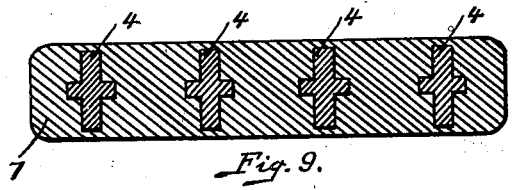
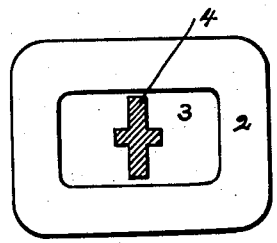
Fig. 9.
Fig. 7.
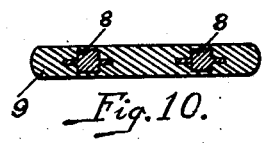 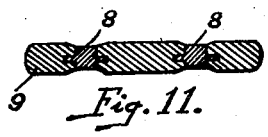
Fig. 10.  Fig. 11.
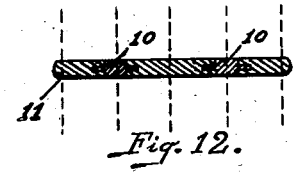
Fig. 12.
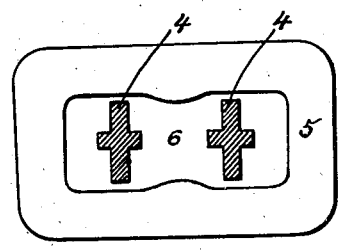
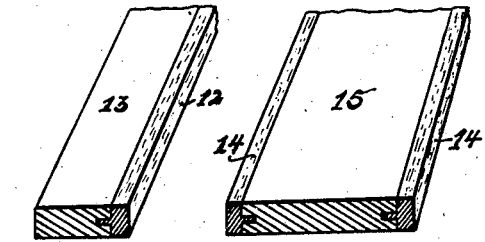
Fig. 8.
Fig. 13.  Fig. 14.
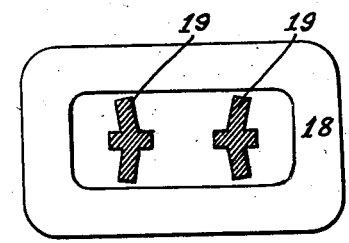 
Fig. 15.
Fig. 16.
INVENTOR:
Max R. Trembour Patented Mar. 20, 1934

1,952,002

UNITED STATES PATENT OFFICE 1,952,002

PROCESS OF MANUFACTURING COMPOSITE STEEL ARTICLES

Max R. Trembour, Beaver, Pa., assignor to Jessop Steel Company, Washington, Pa., a corporation of Pennsylvania Application April 22, 1933, Serial No. 667,413

12 Claims. (Cl. 29—188)

This invention relates to the manufacture of composite or bimetallic stock in the form of bars or strips for the production of cutting tools of various types, such as lathe and planer tools, saws, and the like, comprising a body of a cheaper and softer metal, such as ordinary or lightly alloyed steel, and a smaller portion of a harder and more expensive metal, such as high-speed steel, high-carbon, high-chrome steel and the like, the latter being permanently welded to the former so as to form one or both of the narrower faces of the generally flat bar or strip and two or four of its corners.

Composite products of this kind cannot be manufactured by ordinary pressure-welding methods, such as those employed for the welding of ordinary carbon or lightly alloyed steels, and for this reason high-speed steel and similar highly alloyed hard steels have been considered unweldable by pressure.

I have found, however, that this is not absolutely true, but that these steels actually can be pressure-welded, provided that certain precautions are carefully observed. I have found that it is necessary, not only to provide the two different steels, which are to be welded, with perfectly clean metallic contact surfaces, but also to form a complete gas tight seal around the edges of these surfaces, which is most successfully done by casting one steel, usually the softer, in a molten condition around a carefully cleaned solid piece or bar of the other steel, usually the harder, so as to form a continuous gas tight envelope of the former around the latter.

I have found further that, in the case of two components of greatly different hardnesses and plasticities at rolling temperatures, as, for example, high speed and ordinary mild steel, it is necessary to symmetrically arrange the distribution of the hard and soft components within the workpiece, and that during the rolling for the purpose of either welding or forming, it is essential to preserve the continuity of the envelope until the components have been permanently welded, and the symmetry in the distribution of the components until the hot-forming or rolling operation has been completed.

In the article as hot-rolled the hard component is consequently, as a rule, still embedded in the soft component, and, in order to bring it to the surface, as required for the finished article, it is necessary to grind or machine two sides of the rolled product, and finally, in order to expose a working edge or face of the hard component, the rolled article must be cut longitudinally along the centerline of the hard component.

The copending application of Harry Wilson, Jr. and Max R. Trembour, Serial Number 604,646 describes a method of manufacturing composite steel articles based upon the above described principles of procedure.

I have now found that the rolling of such articles, especially of flat sections, in which the hard component forms or covers one or both of the narrow sides of the flat section, can be facilitated and cheapened considerably, and that at the same time the weld between the two components can be greatly improved and strengthened, by the method which I shall now describe.

My process will be described in detail with reference to the attached drawing in which Figs. 1, 2, 3, 4, 5 and 6 are transverse sectional views of various forms of bars of the tool steel inserts; Figs. 7 and 8 are plan views of moulds with inserts in position, the latter being shown in section; Fig. 9 is a transverse sectional view of an ingot with four inserts therein; Fig. 10 is a transverse sectional view of a plate rolled from an ingot formed in the mould of Fig. 8; Fig. 11 is a view similar to Fig. 10 with certain of the soft steel cut away; Fig. 12 is a transverse section of a completed band, the division in strips being indicated by dotted lines; Fig. 13 is a perspective view of a strip of composite metal; Fig. 14 is a portion of a band before being divided into strips similar to that of Fig. 13; Fig. 15 is a transverse sectional view showing the outward bulge of the central portion of the cross-sections of the inserts; and Fig. 16 is a plan view of a mould with inserts of curved cross-section in position, the inserts being shown in section.

The first step of my process comprises the forming of the hard tool steel component into bars of a generally oblong cross section similar to those illustrated in Figs. 1, 2, 3, 4, 5 and 6 of the drawing. Fig. 1 represents a bar of rectangular section with two wide and two narrow sides of the ordinary so called "flat" bar. The bar of Fig. 2 is similar, but the wider sides of the oblong section have a slight outward curve. Figs. 3 and 4 represent a bar similar in section to that of Fig. 1, but having a projection or rib on both wider sides. The bar of Fig. 5 is similar to that of Fig. 2, but it has projections similar to those of Figs. 3 and 4. The bar of Fig. 6 differs from that of Fig. 3 in that it has two projections or ribs on each of its wider sides.

Sections without projections or ribs, such as illustrated in Figs. 1 and 2, will hereafter be referred to as oblong sections, while those with projections, such as shown in Figs. 3, 4, 5 and 6, will be referred to as oblong cruciform sections.

The second step comprises the annealing and cleaning of the rolled bars. I have found that the annealing, that is the softening and the removing of the rolling strains, is important, especially if the bars consist of high-speed, high-carbon, high-chrome, or similar highly alloyed hard steels, in order to prevent the inserts from cracking, when the molten ordinary steel is cast about them. The cleaning may be done by pickling or sandblasting or still better, by a combination of both methods. It is best to do the final cleaning after the bars have been cut to the proper lengths, usually about 3 to 4 inches shorter than the moulds, into which they are to be placed, and after the bars have been fastened together (in the case of multiple bar inserts) and have been provided with spacing strips welded across their ends in order to keep them at the proper distance from each other and from the mould walls.

The next step consists in arranging these inserts in the moulds. Before doing this, it is well to warm them sufficiently, especially in cold weather, to take the chill out of them, but in doing this care should be taken to keep the temperature uniformly below the point, at which surface discoloration might set in.

The inserts are then placed into the moulds. It will be seen from the drawing that these moulds, marked 2 in Fig. 7, 5 in Fig. 8 and 18 in Fig. 16, are also of an oblong section, and that the inserts, marked 4 in Figs. 7 and 8, and 19 in Fig. 16, are positioned in the moulds so that the long axis of their oblong section is at right angles to the long axis of the oblong mould section. The edges, or narrower faces, of the inserts are close to the faces, or wider sides, of the mould chamber, generally spaced at a distance of from ¼ to ½ inch from the latter, while their wider faces are spaced at a much greater distance from the narrower sides of the oblong chamber.

It will also be seen from the drawing that the inserts are so positioned within the mould chamber that, when the remaining space within the latter, marked 3 in Fig. 7, and 6 in Fig. 8, is now filled with the molten ordinary mild steel, the inserts are completely enclosed by and symmetrically arranged within the latter.

Fig. 9 shows the cross section of an ingot formed by casting the ordinary mild steel 7 around four insert bars marked 4 of oblong cruciform design as illustrated in Fig. 3, the hard tool steel being enveloped by and positioned within the milder steel as described above.

The cast steel should be clean and as free as possible from nonmetallic inclusions, which would tend to be deposited in patches at the contact surfaces of inserts and envelope, where they would interfere with the subsequent welding operation. The mild steel may be top or bottom cast, but the latter method is, as a rule, more satisfactory.

The next step comprises the welding of the components, which takes place coincidentally with the reduction of the slab ingot into a plate or band. While this may be done by forging or pressing, it is usually cheaper and more satisfactory to do it by rolling. When the ingot is heated for this operation, the heating should be carried out with the same care and to the same temperatures as would apply to a workpiece consisting entirely of the material used for the inserts, the same rule also applying to the temperatures of the workpiece during the rolling operation itself. The ingot is preferably rolled lengthwise or parallel to the axes of the inserts with the wider sides of the oblong section of the ingot in engagement with the rolls.

Fig. 10 represents the cross section of a plate rolled from an ingot with two oblong cruciform inserts cast in a mould as illustrated in Fig. 8. The width of the workpiece has been increased only slightly during the rolling, but its thickness has been considerably reduced, and, of course, its length has been correspondingly increased. A similar change has taken place in the corresponding dimensions of the two inserts 8, which are now permanently welded to the envelope metal 9, which still covers them completely. The weld is greatly strengthened by the ribs on the sides of the inserts, which project into corresponding grooves in the ordinary steel. Moreover, these ribs or projections seem to assist in the rolling of the workpiece, in so far as they help the inserts to maintain their position relative to the envelope, prevent the splitting of the ingot during the first passes between the rolls and accelerate the formation of a weld.

The rolling is best done between a pair of ordinary cylindrical plate or band mill rolls and no edging is required, although one or more edging passes may be given, if so desired.

During this rolling there sometimes occurs, especially in ingots having a plurality of inserts, a slight distortion of the inserts, which is probably due to the natural flow of the metal away from the center of the workpiece toward the narrow sides not subjected to pressure, which causes these sides to bulge. As a consequence the inserts may assume a similar outward bulge at their centers, so that after rolling the distance between the inserts may be somewhat greater at their centers than at their ends. As a rule this is not sufficient to cause practical difficulties, and I have found that this tendency can be overcome by forming the insert bars with a slight curve or bend in their cross-section and by placing them into the mould with the convex sides facing the center of the latter.

In Fig. 15 of the attached drawing the outward bulge of the envelope metal 17 at the narrow sides of the rolled plate and the corresponding spreading apart of the inserts 16 at their centers is illustrated, while Fig. 16 shows a mould 18 with an insert consisting of two oblong cruciform insert bars similar to those shown in Fig. 8 and Fig. 3, but being slightly curved as explained above, and also shows the proper position of these inserts relative to the mould chamber with the convex sides facing the center of the latter.

Inserts with a curve or bend to their generally oblong or oblong cruciform section will hereafter be referred to as bars or inserts of a curved oblong or of a curved oblong cruciform section.

I have found that this tendency of the inserts to bulge outward at their centers is most pronounced in ingot sections approaching the square and diminishes as the thickness of the ingot is reduced, and that it can furthermore be counteracted by designing the mould chamber as indicated in Fig. 8, so that its wider sides are slightly curved inward between two inserts.

After reduction of the ingot into the plate illustrated in Fig. 10, the inserts are welded to the envelope, but are still completely enclosed within the latter. The thin cover of mild steel over the inserts on the two wide sides of the plate can now be removed by grinding or machining, so that the originally narrower faces of the inserts are now exposed, as illustrated in Fig. 11.

I have found that it may be desirable to cover these faces of the inserts, before placing them into the moulds and casting the mild steel, with a suitable weld-preventing material, which will prevent carbon migration from one component to the other, and will also facilitate the removal of the aforesaid coverings.

Often, however, the removal of these coverings at this stage is not necessary, and the workpiece may be rolled directly down to the thickness desired for the finished plate or band, and the remaining film of soft envelope material may be removed from the inserts after completion of the rolling.

The finished plate or band is illustrated in Fig. 12. As will be seen from the drawing, the symmetry of the original arrangement of the components has been maintained up to this point. It is disturbed now for the first time, and the plate or band is cut into a number of bars or strips by a series of longitudinal cuts running alternately through the ordinary steel and through the centers of the tool steel inserts, as indicated by the dotted lines in Fig. 12. It will be noted that each insert provides two bars or strips with tool steel edges.

The plates or bands may be cut as rolled and while they are still hot, but it is generally better to anneal them first and grind them (if necessary) and cut and machine them cold.

It is obvious that, in order to facilitate the cutting operation, the roller must exercise care in rolling the bands or plates so that they are straight.

Fig. 13 represents on a larger scale a view of one of the four strips cut out from the band of the cross section illustrated in Fig. 12. It will be seen that the main portion or body of the strip consists of the ordinary steel 13, to which is welded a much smaller portion of the tool-steel 12, in such a way that the latter forms one of the narrower sides or two of the four corners of the rectangular flat section.

It is obvious that, by omitting the central cut, a strip as illustrated in Fig. 14 can be obtained, which has all four corners or both of its narrower faces composed of toolsteel, and that, if desired, from an ingot with four insert bars, such as shown in Fig. 9, three such strips can be produced in addition to two strips similar to the one illustrated in Fig. 13. Also, if desired the ingot with four insert bars may be cut into eight strips such as that of Fig. 13.

These composite bars and strips are suitable for the manufacture of many kinds of cutting and slotting tools, for which solid high-speed and other special steel tools have been used heretofore, and it is obvious that they afford a considerable saving in cost, not only through the replacement of a large proportion of expensive special steel by ordinary steel, but also through the greater ease of forming and machining the soft body material.

Having described my invention I claim:

1. In the manufacture of composite flat bars or strips with ordinary steel body and toolsteel edge, the method of welding the two components, which comprises the forming of an ingot of oblong cross section by casting a complete envelope of ordinary steel around at least one insert of toolsteel of curved oblong cruciform section and having surfaces prepared for welding and being positioned in the mould symmetrically with reference to its section and so that the longer axes of the insert cross sections are parallel to each other and to the shorter axis of the mould chamber section, and the convex sides of the curved insert sections faces toward the center line of the mould and then rolling the composite slab ingot thus formed into a plate or band without disturbing the aforesaid continuity of the ordinary steel envelope or the symmetry in the arrangement of the components.

2. A method of making composite metallic bars, strip and like flat elongate shapes having a main body portion of relatively soft steel and an elongate edge portion of difficultly pressure weldable harder steel welded to one edge thereof, comprising casting said relatively soft steel completely about at least one preformed annealed and cleaned insert of said harder steel of oblong cross section to form a composite slab ingot of oblong cross section in which the insert is completely enveloped and is positioned longitudinally with respect to the longitudinal axis of the ingot with its wide faces parallel to and at a substantial distance from the narrow sides of the ingot and with its narrow edges adjacent and parallel to the wide sides of the ingot but covered thereby, hot rolling the ingot by application of roll pressure chiefly to the wide sides of the ingot and thereby forming a plate or band having the insert extending through substantially its entire length and permanently welded by such rolling to the cast metal, and said plate or band being divisible into a plurality of said composite metallic shapes by cutting longitudinally through the insert.

3. A method of making composite metallic bars, strip and like flat elongate shapes having a main body portion of ordinary or lightly alloyed steel and a continuous elongate edge portion of highly alloyed or high speed steel welded to one edge thereof, comprising casting said ordinary steel completely about at least one preformed and annealed insert of said highly alloyed steel of oblong cruciform section to form a slab ingot of oblong cross section in which the insert is wholly enveloped and is positioned longitudinally with respect to the longitudinal axis of the ingot with its wide faces parallel to but a substantial distance from the narrow sides of the ingot and with its narrow edges adjacent and parallel to the wide sides of the ingot but covered thereby, the faces of the insert to be welded being in clean weldable condition prior to said casting, hot rolling the ingot by application of roll pressure principally to said wide sides of the ingot and thereby forming a plate or band having the insert extending through substantially the entire length and permanently welded by such rolling to the cast metal, and said plate or band being divisible into a plurality of said composite metallic shapes by cutting longitudinally through the insert.

4. A method of making composite metallic bars, bands, and the like flat elongate shapes having a main body portion of relatively soft steel and an elongate edge portion of harder steel, such as high speed and other highly alloyed and difficultly pressure-weldable steels, welded to one edge thereof, comprising casting said relatively soft steel completely about at least one preformed insert of said harder steel of oblong cruciform cross section, the faces of the insert to be welded being in clean weldable condition and the insert being positioned longitudinally in a slab ingot mold of oblong cross section with its wide faces parallel to the narrow sides of the mold and with its narrow edges parallel with and close to but out of contact with the wide sides of the mold, thereby forming a laminated slab ingot in which the insert is completely enveloped within the cast relatively soft steel, the narrow edges of the insert are only lightly covered by the cast steel, and in which the insert and cast steel are not welded, and causing welding between the insert and cast soft steel by hot rolling the ingot by application of roll pressure chiefly to the wide sides of the ingot to form a plate or band having the insert extending through substantially its entire length and permanently welded by such rolling to the cast metal, said plate or band being divisible into a plurality of said composite shapes by cutting longitudinally through the insert.

5. A method according to claim 4 in which said inserts are annealed prior to casting to form the ingot.

6. A method of making composite metallic bars, strip and like flat elongate shapes having a main body portion of ordinary or lightly alloyed steel and an elongate edge portion of highly alloyed or high speed steel welded to an edge thereof, comprising casting said ordinary steel completely about a plurality of preformed annealed and cleaned inserts of said highly alloyed steel of curved oblong cruciform section to form a slab ingot of oblong cross section in which said inserts are completely enveloped and positioned longitudinally therein symmetrically and parallel to each other with their convex sides facing one another, the narrow edges of the inserts being closely adjacent to the wide sides of the ingot but covered thereby and the wide faces of the inserts being parallel to but a substantial distance from the narrow edges of the ingot, hot rolling the ingot to form a plate or band having the inserts extending through substantially its entire length and permanently welded to the cast metal by such rolling, the pressure in said rolling being applied chiefly to said wide sides of the ingot whereby the narrow edges of the insert become the wide sides of the insert strips in the finished band, and the band being divisible into a plurality of said composite shapes by cutting longitudinally through the inserts.

7. A method of making composite metallic bars, strip and like flat elongate shapes having a main body portion of relatively soft steel and an elongate edge portion of difficultly pressure weldable harder steel welded to an edge thereof, comprising annealing and cleaning the surfaces of at least one preformed insert of said harder steel of oblong section, casting said soft steel completely about at least one such insert positioned longitudinally in a slab ingot mold with the wide faces of the insert parallel to the narrow sides of the ingot but at a substantial distance therefrom and with the narrow edges of the insert close to the adjacent sides of the mold but out of contact therewith, thereby forming a composite ingot in which the insert is completely enveloped within the cast relatively soft steel, hot rolling the ingot to form a plate or band having the insert extending through substantially the entire length and permanently welded by such rolling to the cast metal, removing the thin skin of metal overlying the inserts to expose the insert, and cutting the plate or band longitudinally through the insert to form a plurality of said composite elongate flat shapes.

8. A method of making composite metallic bars, strip and like flat elongate shapes having a main body portion of relatively soft steel and an elongate edge portion of difficultly pressure weldable harder steel welded to an edge thereof, comprising annealing and cleaning the surfaces of a plurality of preformed inserts of said harder metal of oblong cruciform section, casting said ordinary steel completely about a plurality of said inserts to form a composite ingot of oblong cross section in which the inserts are completely enveloped and are positioned parallel to each other longitudinally and substantially symmetrically to the longitudinal axis of the ingot with their wide faces parallel to but a substantial distance from the narrow sides of the ingot and with their narrow edges closely adjacent to but covered by the wide sides of the ingot, hot rolling the ingot by application of rolls chiefly to said wide sides of the ingot and thereby forming a plate or band having the insert extending through substantially its entire length and permanently welded by such rolling to the cast metal, removing the thin skin of said ordinary steel overlying said inserts, and cutting longitudinally through the inserts and through said cast metal between the inserts to form a plurality of said shapes.

9. A method of making composite metallic bars, strip and like flat elongate shapes having a main body portion of relatively soft steel and an elongate edge portion of difficultly pressure weldable harder steel welded to one edge thereof, comprising annealing and cleaning a plurality of preformed inserts of said harder steel of oblong cruciform section, casting said soft steel about said inserts positioned longitudinally and parallel in a slab ingot mold symmetrically to its section with their wide faces parallel to the narrow sides of the mold and with their narrow edges parallel with and close to but out of contact with the broad sides of the mold, thereby forming a composite ingot in which the inserts are completely enveloped within the cast ordinary steel, hot rolling the ingot to form a plate or band having the inserts extending through substantially its entire length and permanently welded by such rolling to the cast metal, and said plate or band being divisible into a plurality of said composite metallic shapes by cutting longitudinally through the inserts and the soft steel.

10. A method of making composite metallic bars, strip and like flat elongate shapes having a main body portion of relatively soft steel and an elongate edge portion of difficultly pressure weldable harder steel welded to one edge thereof, comprising cleaning a plurality of annealed preformed inserts of said harder steel of oblong cross section, casting said soft steel entirely about said inserts positioned longitudinally and parallel in a slab ingot mold of oblong cross section symmetrically to its cross section and with their wide faces parallel to the narrow sides of the mold and with their edges adjacent and parallel to the wide sides of the mold but out of contact therewith and thereby forming a composite ingot in which the inserts are completely enveloped by the cast metal, hot rolling the ingot by application of roll pressure chiefly to the wide sides of the ingot and thereby forming a plate or band having the inserts extending through substantially its entire length and permanently welded by such rolling to the cast metal, annealing said plate or band and cutting longitudinally through the inserts and soft steel to form a plurality of said shapes.

11. A process according to claim 10, said inserts being of oblong cruciform section.

12. A method of making composite metallic bars, strip and like flat elongate shapes having a main body portion of relatively soft steel and an elongate edge portion of difficultly pressure weldable harder steel welded to an edge thereof, comprising cleaning a plurality of annealed preformed inserts of said harder steel of curved oblong cruciform section, casting said soft steel completely about said inserts positioned parallel longitudinally in a slab ingot mold of oblong cross section with their convex faces toward the longitudinal axis of the mold, with their wide faces parallel to the narrow sides of the mold but at a substantial distance therefrom and with their narrow edges close to but out of contact with the wide sides of the mold thereby forming a composite ingot in which the inserts are completely enveloped within the cast relatively soft steel, hot rolling the ingot to form a plate or band having the inserts extending through substantially the entire length and permanently welded by such rolling to the cast metal, and cutting the plate or band longitudinally through the inserts and soft steel to form a plurality of said composite elongate flat shapes.

MAX R. TREMBOUR.